United States Patent
Suzuki et al.

[11] Patent Number: 5,825,144
[45] Date of Patent: Oct. 20, 1998

[54] DRIVE CONTROL APPARATUS FOR A ROTATING MACHINE

[75] Inventors: Masatoshi Suzuki, Kanagawa-ken; Koichi Futsuhara; Masayoshi Sakai, both of Saitama-ken, all of Japan

[73] Assignees: Kao Corporation; The Nippon Signal Co., Ltd., both of Tokyo, Japan

[21] Appl. No.: 491,991

[22] PCT Filed: Nov. 18, 1993

[86] PCT No.: PCT/JP93/01695

§ 371 Date: Jul. 17, 1995

§ 102(e) Date: Jul. 17, 1995

[87] PCT Pub. No.: WO95/14326

PCT Pub. Date: May 26, 1995

[51] Int. Cl.[6] .................................................. H02K 17/32
[52] U.S. Cl. .............................. 318/434; 318/445; 361/1
[58] Field of Search .................................... 318/434, 254, 318/438, 439, 445, 474; 361/1, 23, 93, 31, 65

[56] References Cited

U.S. PATENT DOCUMENTS

| | | | |
|---|---|---|---|
| 4,235,085 | 11/1980 | Torita | 318/434 X |
| 4,661,880 | 4/1987 | Futsuhara . | |
| 4,675,935 | 6/1987 | Kasper et al. | 318/434 X |
| 4,757,417 | 7/1988 | Futsuhara . | |
| 5,027,114 | 6/1991 | Kawashima et al. . | |
| 5,218,541 | 6/1993 | Sakakibara et al. | 318/434 X |

FOREIGN PATENT DOCUMENTS

| | | |
|---|---|---|
| 62-32402 | 2/1987 | Japan . |
| 62-52679 | 4/1987 | Japan . |
| 1-177888 | 7/1989 | Japan . |
| 2-262008 | 10/1990 | Japan . |
| 4-19569 | 1/1992 | Japan . |
| WO94/23303 | 10/1994 | WIPO . |

*Primary Examiner*—Karen Masih
*Attorney, Agent, or Firm*—Finnegan, Henderson, Farabow, Garrett & Dunner, L.L.P.

[57] ABSTRACT

The invention relates to a drive control apparatus for a rotating machine having a movable part which is rotatably driven by a motor.

The apparatus has a fail-safe construction which gives an output of logic value "1" when the movable part is stopped, wherein, to enable supply of motor current to start a motor (2) at the motor start-up time under a condition of the movable part stopped, motor drive permission is granted by a logical product output which is obtained by a logical product operation of a start signal generated by switching a start switch on, and a logical sum output obtained by a logical sum operation of an output of a current sensor (3) generating an output of logic value "1" when the motor current does not flow and an output of a rotation sensor (4) generating an output of logic value "1" when the movable part is rotating.

13 Claims, 10 Drawing Sheets

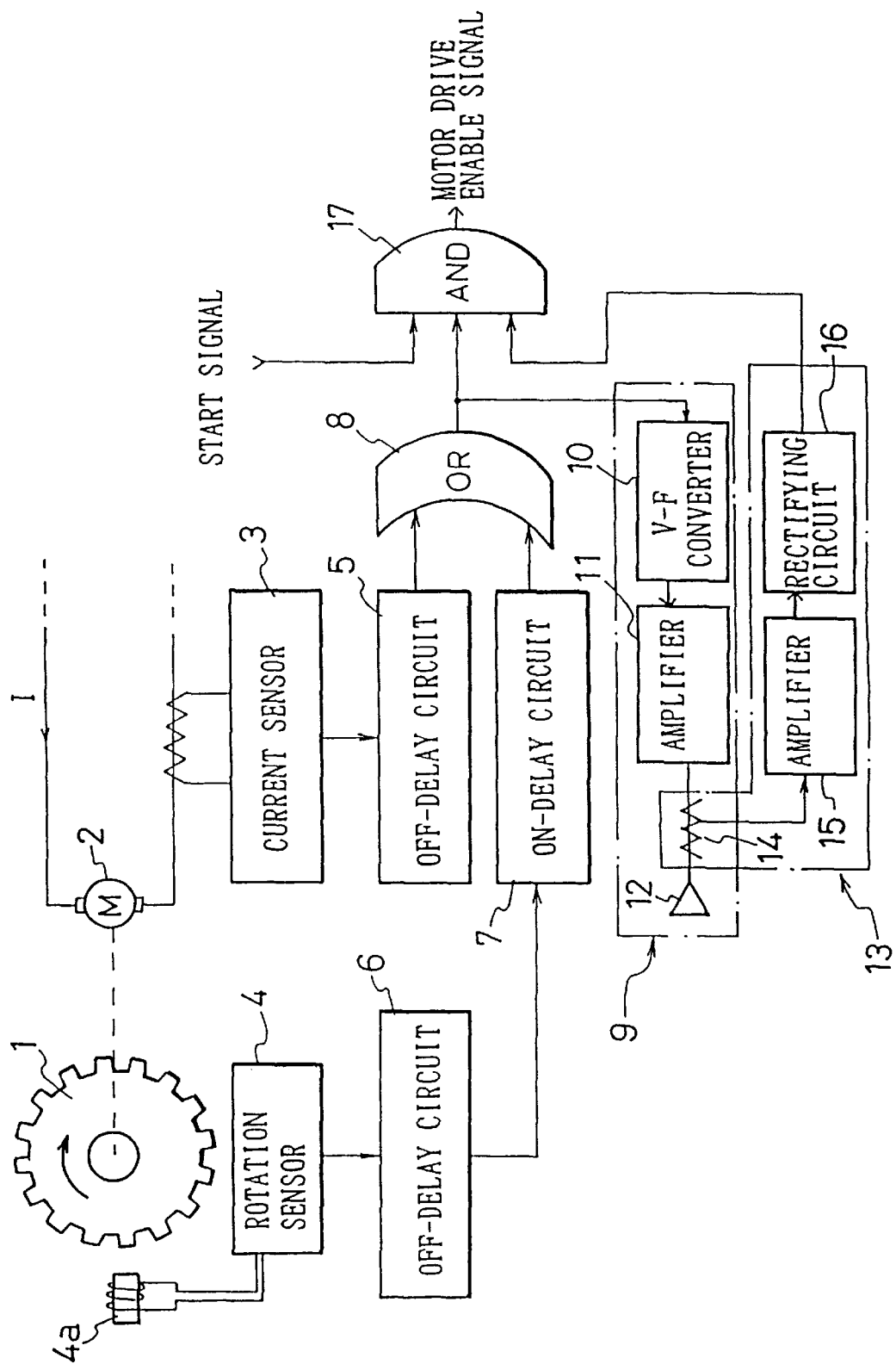

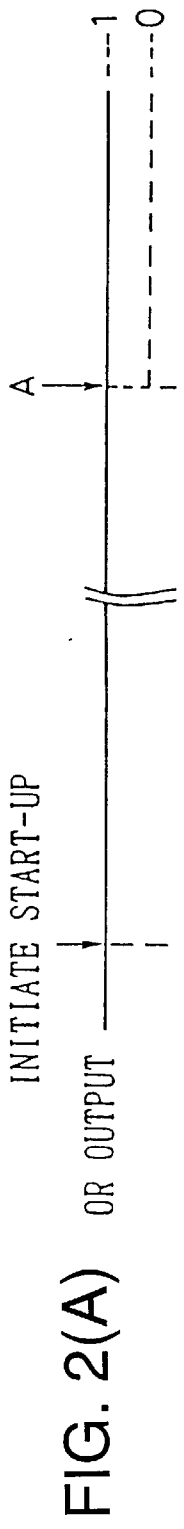
FIG. 2(A) OR OUTPUT
FIG. 2(B) MONITORING SENSOR OUTPUT
FIG. 2(C) START SIGNAL
FIG. 2(D) AND OUTPUT
FIG. 2(E) CURRENT SENSOR OUTPUT
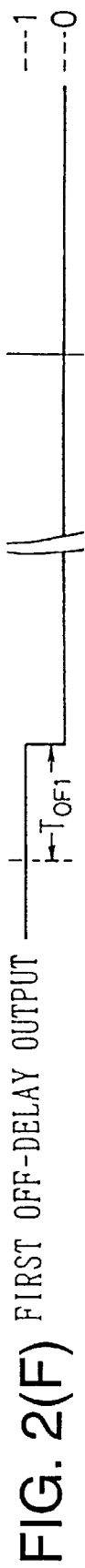
FIG. 2(F) FIRST OFF-DELAY OUTPUT
FIG. 2(G) ON-DELAY OUTPUT

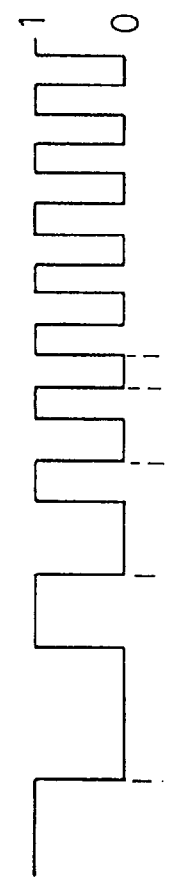
FIG. 3(A)  ROTATION SENSOR OUTPUT
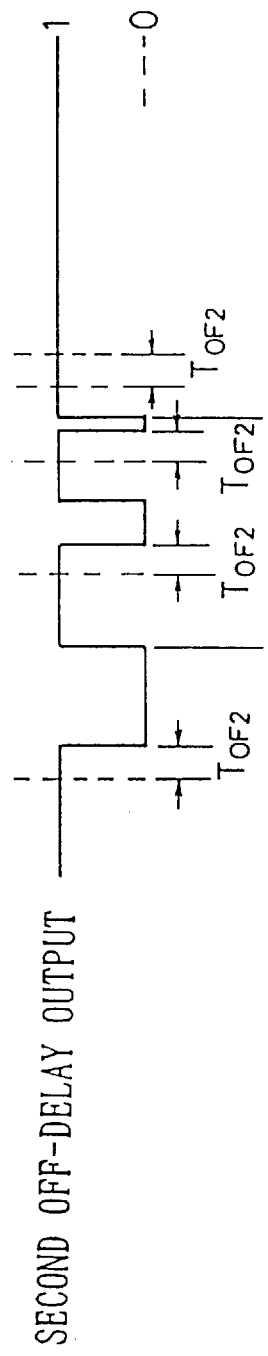
FIG. 3(B)  SECOND OFF-DELAY OUTPUT
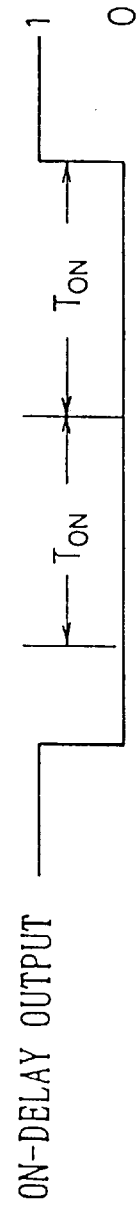
FIG. 3(C)  ON-DELAY OUTPUT

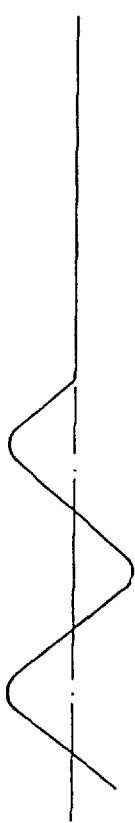
FIG. 5(A) CURRENT I
FIG. 5(B) OUTPUT e
FIG. 5(C) OUTPUT $e_d$
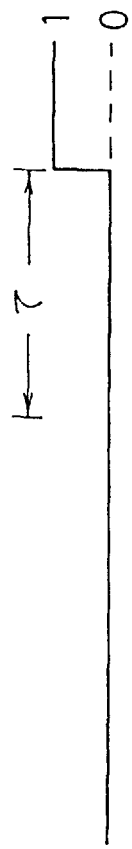
FIG. 5(D) OUTPUT z

DRIVE CONTROL APPARATUS FOR A ROTATING MACHINE

TECHNICAL FIELD

The present invention relates to a highly safe drive control apparatus for a rotating machine, which controls the supply of current to a motor while monitoring rotation of a movable part rotatably driven by the motor.

BACKGROUND ART

For example, with a reaction apparatus used in a chemical factory for stirring and mixing materials such as solids to produce a reaction, a stirring rod is provided inside a large mixing vessel, which is rotatably driven by a motor to thereby stir and mix the materials inside the vessel. In this case, if rotation of the stirring rod stops during stirring, due for example to failure of the motor shaft or a gear section which mechanically connects the motor to the stirring rod, so that stirring ceases, then normal mixing is no longer possible even though the reaction apparatus is operating. Local chemical reaction of the materials can thus occur causing high temperatures. If this situation continues for too long, there is the likelihood of a serious accident with damage to the reaction apparatus.

To prevent such an accident, it is necessary in the safe drive control of a rotating machine incorporating a rotatably movable part rotated by a motor, to indicate as a danger condition a state where rotation of the movable part has stopped even though a current is flowing in the motor. Accordingly, with this drive control system, it is necessary to have a construction such that a signal indicating safety is produced when the movable part is rotating, with the motor current being supplied based on the safety indicating signal, and such that a signal indicating danger is produced when the movable part is not rotating even though a current is being supplied to the motor, with the motor current supply being stopped based on the danger indicating signal.

However, with such a system structure, a contradiction arises at the time of start up of the rotating machine since at this time, because the movable part is not rotating, the signal indicating danger will be produced, so that current will not be supplied to the motor and hence the motor can not be driven.

Moreover, in general a warning device is provided for warning of a danger condition which is created when the movable part is stopped when it should be rotating.

When in this case a lamp is used for the warning device, then if the construction is such that at the time of a safe condition (the movable part is rotating when it should be rotating) a green lamp comes on, while at the time of a danger condition (the movable part is stopped when it should be rotating), the lamp is extinguished, then a fail-safe construction results wherein for example, when a lamp burn out fault occurs, the extinguishing of the lamp indicates danger.

However, when a speaker or buzzer and the like is used as a warning device, then with the construction (ie. fail-safe construction) as with the abovementioned lamp, wherein an output is produced at the time of safety, while at the time of danger, the output is extinguished, since the situation will normally be safe, a sound will be continuously produced from the speaker or buzzer resulting in a disturbing noise. Therefore warnings from a speaker or buzzer are normally used with a method wherein a sound is only produced at the time of danger, that is to say a drive output for the speaker or buzzer is only produced at the time of a danger condition. However, with such a normal use method, since sound producing energy is not produced under normal situations, then there is a problem when the situation arises wherein a real danger needs to be reported but cannot due to a fault.

The present invention takes into consideration the above situation, with the object of solving, with a fail-safe construction, the contradiction in the system wherein motor drive permission is granted after verifying the rotation stop condition of a movable part, that at the time of start-up the motor cannot be driven due to the movable part being stationary. Moreover, it is a further object of the present invention, in the case wherein a warning device is used which generates a warning sound from a speaker or buzzer and the like, to produce a warning sound which can be heard by a person only in a danger condition, and not under normal conditions, with a fail-safe construction which can reliably detect a fault in the warning apparatus and stop the motor drive at the time of such a fault.

DISCLOSURE OF THE INVENTION

Accordingly with the present invention, a drive control apparatus for a rotating machine incorporating a movable part rotatingly driven by a motor comprises: a fail-safe current sensor which generates an output of logic value "1" when a motor current for supply to the motor is not flowing, and which generates an output of logic value "0" when the motor current is flowing, and which gives an output of logic value "0" at the time of a fault, a fail-safe rotation sensor which generates an output of logic value "1" when the movable part is rotating, and which generates an output of logic value "0" when the movable part is stopped, and which gives an output of logic value "0" at the time of a fault, a fail-safe first logic processing section which judges a danger condition when the motor current is flowing and the movable part is stopped, based on a logic operation on the outputs from the current sensor and the rotation sensor and generates an output of logic value "0", and which gives an output of logic value "0" at the time of a fault, and a fail-safe second logic processing section which generates a motor drive enable output of logic value "1" to allow power supply to the motor when an output of logic value "1" of the first logic processing section, and a start command output of logic value "1" produced by switching on a start switch of the rotating machine are both input together thereto, and which gives an output of logic value "0" at the time of a fault.

With such an arrangement, when rotation of the movable part is stopped while the motor current is flowing, then the outputs from the current sensor and the rotation sensor both become logic value "0" so that the output of the first logic processing section becomes a logic value "0" and the output of the second logic processing section becomes a logic value "0". The motor drive enable output of logic value "1" is thus cancelled so that the supply of motor current is stopped, and the danger condition thus avoided. However at the time of motor start-up, the current sensor detects a nil motor current so that the output becomes a logic value "1", causing the output of the first logic processing section also to become a logic value "1", and due to the input of the start signal of logic value "1" generated by switching on the start switch, the output from the second logic processing section becomes a logic value "1" so that a motor drive enable output can be generated. Therefore the motor current can be supplied even at the time of motor start-up when rotation of the movable part is stopped, so that the motor can be reliably started.

The current sensor may comprise; a saturable magnetic body core wound with three windings namely first, second and third windings, which becomes saturated when a motor current flows in the third winding, a high frequency signal generating circuit for supplying a high frequency excitation signal to the first winding, an AC amplifier connected to the second winding for amplifying a received signal received by the second winding, a rectifying circuit for rectifying an output from the AC amplifier, and a fail-safe on-delay circuit which delays the output from the rectifying circuit by a predetermined time delay and then generates an output, and wherein the delay time is not shortened at the time of a fault.

The rotation sensor may involve for example an electromagnetic sensor type which comprises: an electromagnetic coil provided in the vicinity of an outer peripheral portion of a gear which rotates as one with the movable part, a bridge circuit with the electromagnetic coil disposed on one side thereof and resistors disposed on other three sides thereof, an alternating current signal generator for supplying an alternating current signal to the bridge circuit, an AC amplifier for amplifying an unbalanced output of the bridge circuit, a rectifying circuit for rectifying an output of the AC amplifier, and a fail-safe window comparator for generating an output of logic value "1" when an output of the rectifying circuit is within a predetermined level range higher than a power source voltage, and which gives an output of logic value "0" at the time of a fault. Alternatively the rotation sensor may involve an optical sensor type which comprises: a light emitting element and a light receiving element arranged so as to face each other on opposite sides of an outer peripheral recess/protrusion portion of a gear which rotates as one with the movable part, an alternating current signal generator for supplying an alternating current signal to the light emitting element, an AC amplifier for amplifying a received signal output of the light receiving element generated when a light beam from the light emitting element is received, and a rectifying circuit for rectifying an output of the AC amplifier.

The first logic processing section may comprise; a fail-safe first off-delay circuit which delays for a predetermined time delay a falling output of the current sensor from a logic value "1" to a logic value "0", and wherein the delay time is not lengthened at the time of a fault, a fail-safe second off-delay circuit which delays for a predetermined time delay a falling output of the rotation sensor from a logic value "1" to a logic value "0", and wherein the delay time is not lengthened at the time of a fault, a fail-safe on-delay circuit which delays for a predetermined time delay a rising output of the second off-delay circuit from a logic value "0" to a logic value "1", and wherein the delay time is not shortened at the time of a fault, and a logical sum operating circuit which computes a logical sum of the outputs of the first off-delay circuit and the on-delay circuit.

With such a construction, the movable part can be reliably rotated at the time of motor start-up so that the operation of the rotating machine is made safe. More specifically, the movable part does not immediately attain a rotation condition (equal to or above a predetermined rotation speed) even though motor current is being supplied. Therefore, it is judged by means of the second off-delay circuit and on-delay circuit whether or not the rotation of the movable part is equal to or above a predetermined rotation speed, and the output of logic value "1" of the current sensor is maintained for a predetermined time by means of the first off-delay circuit until the movable part attains a speed equal to or greater than the predetermined rotation speed. As a result, the output of the first logic processing section does not becomes a logic value "0" until the movable part attains a speed equal to or greater than the predetermined rotation speed. Hence the motor current can be supplied continuously without change.

The logical sum operating circuit may comprise; a first voltage doubler rectifying circuit for clamping an output of the first off-delay circuit at a power source voltage, and voltage doubler rectifying, and a second voltage doubler rectifying circuit for clamping an output of the on-delay circuit in a similar manner at the power source voltage, and voltage doubler rectifying, with a wired OR output of the rectified outputs of the first and second voltage doubler rectifying circuits made a logical sum output.

Moreover the construction may involve provision of a warning device which generates a warning when an output of the first logic processing section is at logic value "0" but not when at logic value "1", and a fail-safe monitoring sensor for monitoring whether or not the warning device is in a normal condition wherein warning is possible, and generating an output of logic value "1" when normal, and generating an output of logic value "0" when abnormal, and which gives an output of logic value "0" at the time of a fault, with a motor drive enable output of logic value "1" to allow power supply to the motor being generated when an output of logic value "1" from the monitoring sensor is input to the second logic processing section.

With such an arrangement, the situation can be avoided wherein the warning device is not operated even though a danger condition has arisen, so that warning of the danger is not possible. Moreover, at the time of a fault in the warning device preventing generation of a warning, the rotating machine cannot operate.

The construction may be such that the warning device comprises; a signal generating device for outputting an inaudible frequency signal when an output of the first logic processing section is at logic value "1" and outputting an audible frequency signal when the output is at logic value "0", and a warning sound generator which is driven by an output signal from the signal generating device, and the monitoring sensor monitors the presence or absence of an output signal from the signal generating device, and when there is an output signal, judges the warning device as normal and generates an output of logic value "1", while when there is no output signal, judges the warning device as abnormal and generates an output of logic value "0".

With such an arrangement, then even in the case wherein a warning device is used which warns of danger with a warning sound, there is no longer the situation wherein a warning is continuously generated resulting in an annoying sound. Moreover, the construction is such that the motor can only be started under normal conditions wherein the warning device can generate a warning, so that safety is therefore high.

The second logic processing section may be constructed as a fail-safe logical product operation circuit which carries out a logical product operation on an output from the first logic processing section and an output from the start switch, and which carries out a logical product operation with an output from the monitoring sensor added to these outputs.

Moreover, the second logic processing section may comprise, a fail-safe self-hold circuit with the output from the first logic processing section as a reset input and the output from the start switch as a trigger input, which self-holds the trigger input.

In this case, when the output from the first logic processing section once becomes a logic value "0", then the motor cannot be started provided that the start switch is not switched on again.

Furthermore, when a warning device is provided, the second logic processing section may include, a logical product operation circuit which carries out a logical product operation on an output from the first logic processing section and an output from the monitoring sensor, and a fail-safe self-hold circuit with the output from the logical product operation circuit as a reset input and the output from the start switch as a trigger input, which self-holds the trigger input.

BRIEF DESCRIPTION OF THE DRAWINGS

FIG. 1 is an overall structural diagram showing an embodiment of a drive control apparatus for a rotating machine according to the present invention:

FIG. 2 is a time chart for illustrating an operation of the embodiment:

FIG. 3 is a time chart for illustrating a function of a second off-delay circuit and an on-delay circuit for processing a rotation sensor output according to the embodiment:

FIG. 5 is a time chart for illustrating an operation of the current sensor of FIG. 4:

BEST MODE FOR CARRYING OUT THE INVENTION

As follows is a description of embodiments of the present invention with reference to the drawings.

FIG. 1 shows an overall structural diagram of a drive control apparatus for a rotating machine according to an embodiment.

In FIG. 1, a gear 1 which is mechanically connected for example to a stirring rod provided inside a mixing tower, is rotatably driven by a motor 2 via a reduction gear and the like (not shown) to thereby rotate the stirring rod. The gear 1 corresponds to the movable part.

A current sensor 3 is constructed so as to generate an output of logic value "1" corresponding to a high energy condition, when a current does not flow in a motor current power line of the motor 2, and to generate an output of logic value "0" corresponding to a low energy condition when a motor current flows, with a fail-safe construction which gives an output of logic value "0" at the time of a sensor fault. The current sensor 3 is described in detail with reference to FIG. 4 and FIG. 5.

Figure 6:
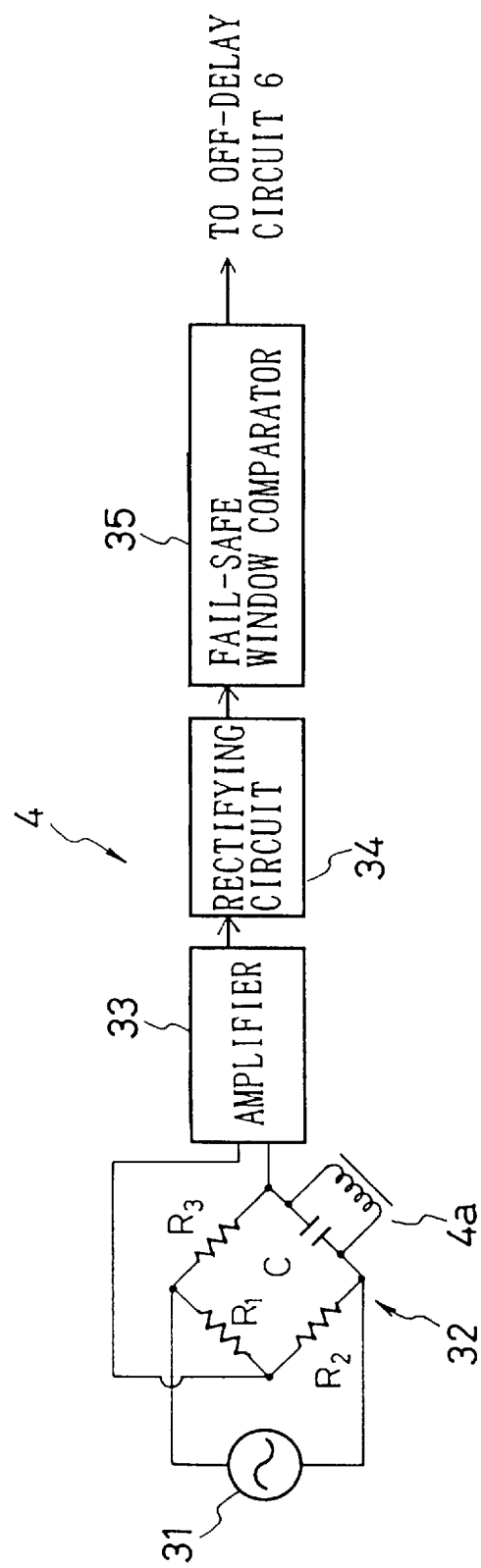
FIG. 6 is a circuit diagram showing an embodiment of a rotation sensor applicable to the present embodiment.
Figure 7:
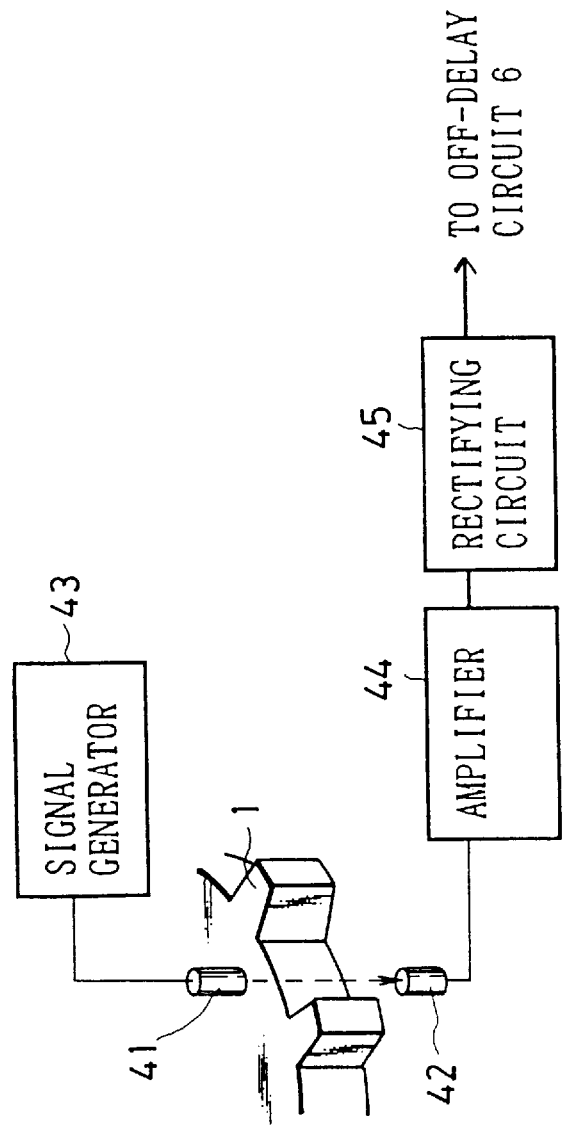
FIG. 7 is a circuit diagram showing an embodiment of another rotation sensor applicable to the present embodiment

A rotation sensor 4 is an electromagnetic type wherein protrusions and recesses on the outer periphery of the gear 1 are extracted as fluctuations in impedance by means of an electromagnetic coil 4a which is provided in their vicinity, to thereby detect rotation of the gear 1. The rotation sensor 4 has a fail-safe construction which generates an output of logic value "1" when the gear 1 is rotating, and which generates an output of logic value "0" when the gear 1 is stopped, and which gives an output of logic value "0" at the time of a sensor fault. FIG. 6 shows an electromagnetic sensor type, while FIG. 7 shows an optical sensor type.

First and second off-delay circuits 5 and 6 delay falling outputs of the respective current sensor 3 and rotation sensor 4 for a predetermined time delay, with a fail-safe construction such that a set delay time is not lengthened at the time of a fault.

An on-delay circuit 7 delays a rising output of the second off-delay circuit 6 for a predetermined time delay, with a fail-safe construction such that a set delay time is not shortened at the time of a fault (refer to PCT/JP 93/00411).

The construction is such that, based on the output from the rotation sensor 4, and by means of the second off-delay circuit 6 and the on-delay circuit 7, only when the rotational speed of the gear 1 is equal to or greater than a predetermined rotational speed, an output from the on-delay circuit 7 of logic value "1" (indicating that the gear 1 is in a rotating condition) is input to an OR circuit 8.

The OR circuit 8 is a logical sum operating circuit which carries out a logical sum operation on the outputs of the first off-delay circuit 5 and the on-delay circuit 7. If one or other of the outputs has a logic value of "1", it generates an output of logic value "1" indicating safety, while if the input signals are both a logic value "0", it generates an output of logic value "0" indicating danger. Moreover, it has a fail-safe construction which gives an output of a logic value "0" at the time of a fault. The OR circuit 8, the first and second off-delay circuits 5 and 6, and the on-delay circuit 7, constitute a fail-safe first logic processing section which judges a danger condition when the motor current is flowing and the movable part is stopped, and generates an output of logic value "0".

A warning apparatus 9 comprises a voltage-frequency converter (referred to hereunder as a V-F converter) 10 (for example model No. AD652 made by the Analog Device Company) which acts as a signal generator, an amplifier 11 for amplifying an output from the V-F converter 10, and a speaker 12 driven by an output from the amplifier 11 which acts as a warning sound generator for generating a warning. The construction is such that when an output of the OR circuit 8 is input to the V-F converter 10, if the output is a logic value "1" (high voltage), a signal of inaudible frequency (for example equal to or above 18 KHz) is output from the V-F converter 10, while if the output is a logic value "0" (low voltage), a signal of audible frequency (several KHz) is output from the V-F converter 10.

A monitoring sensor 13 comprises a current transformer 14 for detecting an output current of the amplifier 11 of the warning apparatus 9, an amplifier 15 for amplifying an output of the current transformer 1 4, and a rectifying circuit 16 for rectifying an output of the amplifier 15. The monitoring sensor 13 monitors whether or not the warning apparatus 9 is in a normal condition wherein a warning is possible. When the warning apparatus 9 is normal, it generates an output of logic value "1", while when the warning apparatus 9 is not normal, it generates an output of logic value "0".

A second logic processing section is constituted by an AND circuit 17 which acts as a logical product operating circuit. It carries out a logical product operation on outputs from the OR circuit 8, the monitoring sensor 13, and a start switch (not shown) for starting the motor, which are input thereto. When all of the input signals are a logic value "1", it gives an output of logic value "1" (motor start enable signal), while when at least one of the input signals is a logic value "0", it generates an output of logic value "0" (motor start inhibit signal). Moreover, it has a fail-safe construction which gives an output of logic value "0" at the time of a fault. The fail-safe AND circuit 17 may comprise a known fail-safe AND gate such as disclosed in U.S. Pat. No. 4,757,417. In the case wherein there is no monitoring sensor for monitoring the warning device, a two input AND gate is possible which carries out a logical product operation on the outputs of the OR circuit 8 and the start switch.

The operation of the drive control apparatus of FIG. 1 will now be described with reference to the time chart of FIG. 2.

Prior to start-up of the motor 2 after switching on the rotating machine power, since the motor current does not flow, the output of the current sensor 3 becomes a logic value "1", and as shown in FIG. 2, the output of the OR circuit 8 becomes a logic value "1" which is input to the AND circuit 17. Moreover, if the warning apparatus 9 is normal, then due to the output of logic value "1" from the OR circuit 8, an inaudible frequency signal is generated from the V-F converter 10 and sent to the speaker 12 by way of the amplifier 11. The monitoring sensor 13 detects the inaudible frequency signal with the current transformer 14 and amplifies this in the amplifier 15 and generates an output from the rectifying circuit 16. As shown in FIG. 2, an output of logic value "1" is generated from the monitoring sensor 13, indicating that the warning apparatus 9 is normal, and this is input to the AND circuit 17.

In this situation, when the start switch is switched on to start the motor, then at the point in time when the start signal of logic value "1" is input to the AND circuit 17, the output of the AND circuit 17 becomes a logic value "1" so that a motor drive enable signal which allows supply of motor current is generated, and the supply of motor current to the motor 2 initiated. When the motor current is supplied to the motor 2, the output of the current sensor 3 becomes a logic value "0". However the output of logic value "1" is held for a delay time $T_{OF1}$ of the first off-delay circuit 5.

When the motor 2 rotates with supply of motor current, the gear 1 begins to rotate, and a pulse signal is produced from the rotation sensor 4 as shown in FIG. 3. With this pulse signal, the pulse width and the signal spacing both become shorter with an increase in rotational speed of the gear 1. The drop in this pulse signal, as shown in FIG. 3, is delayed by a predetermined delay time $T_{OF2}$ by means of the second off-delay circuit 6. When the rotational speed of the gear 1 is equal to or above a predetermined value so that the signal spacing is shorter than the delay time $T_{OF2}$, then an output of logic value "1" is generated continuously from the second off-delay circuit 6. That is to say, the second off-delay circuit 6 carries out pulse width detection on the pulse signal output from the rotation sensor 4. The output of the second off-delay circuit 6 is input to the on-delay circuit 7, and when the rotational speed of the gear 1 is equal to or above a predetermined value so that the output of the second off-delay circuit 6 is continuous with a logic value of "1", the on-delay circuit 7 generates an output of logic value "1" having a predetermined delay time $T_{ON}$, which is then input to the OR circuit 8. The on-delay circuit 7, as shown in FIG. 3, has a sample/hold function for holding the logic value "0" condition at the time the rotational speed of the gear 1 is lower than a predetermined speed and a pulse signal is generated intermittently from the second off-delay circuit 6, for a predetermined delay time $T_{ON}$, so that when the pulse width of the signal output from the second off-delay circuit 6 is shorter than the delay time $T_{ON}$ (rotational speed of the gear 1 is lower than a predetermined speed), it does not generate an output of logic value "1". It thus has the function of detecting that the rotational speed of the gear 1 is equal to or above the predetermined rotational speed. 13

The delay time $T_{OF1}$ of the first off-delay circuit 5 for delaying the drop in output of the current sensors 3, is set so that the output of the current sensor 3 does not become a logic value "0" before the speed of the gear 1 is equal to or above a predetermined rotational speed and an output of logic value "1" is generated from the on-delay circuit 7.

Accordingly, if the current is supplied to the motor 2 so that the gear 1 rotates at a speed equal to or faster than a predetermined rotation speed, then due to the output from the on-delay circuit 7, an output of logic value "1" indicating safety is generated continuously from the OR circuit 8. The output of the AND circuit 17 is thus held at logic value "1" so that a current is continuously supplied to the motor 2 and the mixing operation carried out with the stirring rod.

In a situation wherein for some reason, rotation of the gear 1 is stopped in spite of a current being supplied to the motor 2 (a condition wherein the rotational speed is lower than a predetermined value including zero), the output of the first off-delay circuit 5 remains at logic value "0" due to the flow of motor current, while the output of the on-delay circuit 7 also becomes a logic value "0" (position A of FIG. 2) due to stopping of gear 1 rotation. At this time, the output of the OR circuit 8 becomes a logic value "0" indicating danger, so that the output of the AND circuit 17 becomes a logic value "0", and the motor drive enable signal is cancelled. The supply of motor current to the motor 2 is thus stopped automatically, hence avoiding the dangerous condition wherein rotation of the movable part is stopped in a condition wherein motor current is being supplied. Moreover due to the output of logic value "0" from the OR circuit 8, an audible frequency signal is generated from the V-F converter 10 of the warning apparatus 9, so that a warning sound is produced from the speaker 12 enabling the operator to be warned of the dangerous condition.

If a fault occurs in the warning apparatus 9 so that the output signal of the amplifier 11 is stopped and the speaker 12 cannot be driven (a warning cannot be produced), the output of the monitoring sensor 13 becomes a logic value "0". The output of the AND circuit 17 thus becomes a logic value "0" inhibiting current supply to the motor 2. Consequently, when a speaker is used for warning of danger, the speaker 12 can be driven to produce a sound only at the time of danger and not under normal conditions, so that no annoying sound is produced. Moreover, the construction is fail-safe in that when the warning apparatus is faulty so that it cannot produce a warning, the motor current is stopped, thus ensuring safety.

With the first off-delay circuit 5, if the delay time $T_{OF1}$ is shortened due to a fault, the output becomes a logic value "0" before the rotational speed of the gear 1 reaches a predetermined rotational speed, so that an output of logic value "0" indicating danger is output from the OR circuit 8. Furthermore, in contrast to this, if the delay time $T_{OF1}$ is lengthened due to a circuit fault, then the output from the OR circuit 8 of logic value "1" indicating safety continues for more than necessary, indicating safety even though the gear 1 may not be rotating, thus resulting in a dangerous condition. Consequently, the first off-delay circuit 5 is constructed such that the delay time $T_{OF1}$ is not extended at the time of a fault.

Also, with the second off-delay circuit 6, if the delay time $T_{OF2}$ is erroneously extended at the time of a fault, then an output of logic value "1" indicating a rotating condition is produced in spite of the rotational speed of the gear 1 not having attained the predetermined rotational speed. Therefore the second off-delay circuit 6 also, is constructed such that, as with the first off-delay circuit 5, the delay time TOF2 is not extended at the time of a fault. The construction of such first and second fail-safe off-delay circuits 5 and 6 is described later with reference to FIG. 8.

With regard to the on-delay circuit 7, if the delay time $T_{ON}$ is shortened due to a fault, then an output of logic value "1" indicating a rotating condition is produced in spite of the rotational speed of the gear 1 not having attained the predetermined rotational speed. On the other hand, if the delay time $T_{ON}$ is lengthened, then an output of logic value "1" which has been delayed by the lengthened amount from after termination of the output of logic value "1" from the first off-delay circuit 5, is generated and output from the on-delay circuit 7 to the OR circuit 8. Therefore, during this interval, the output of the OR circuit 8 is produced as an output of logic value "0" indicating danger. Consequently, the construction of the on-delay circuit 7 of the present embodiment (refer to PCT/JP/93/00411), is such that erring of the delay time to a lengthening at the time of a fault is permitted, but erring towards a shortening is positively not permitted.

The specific construction of the respective sensors and circuits will now be described, noting details of the fail-safe characteristics.

First the specific circuit structure of a current sensor shown in FIG. 4 will be described.

Figure 4:
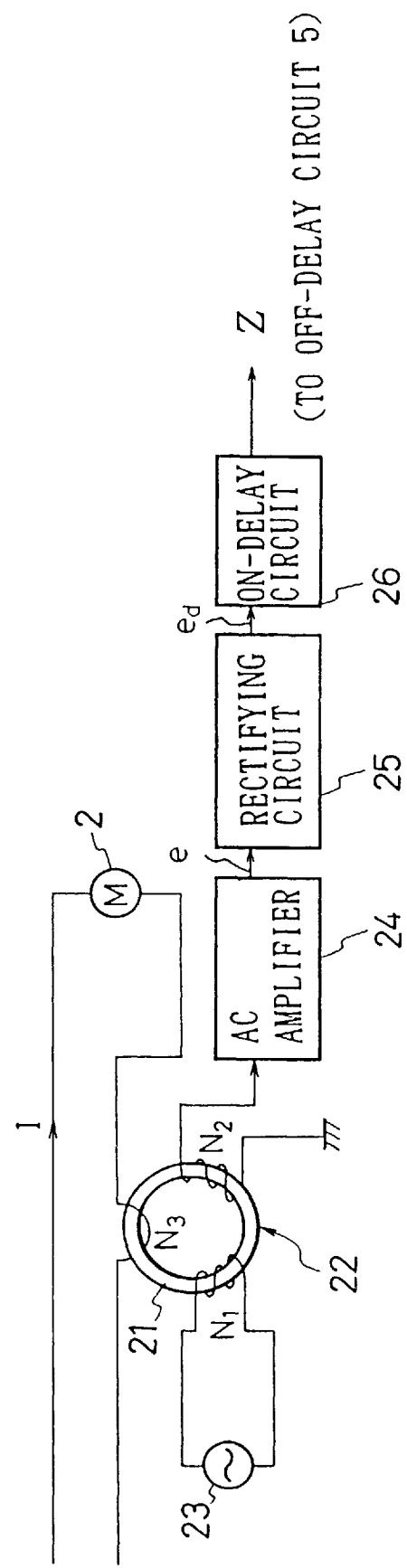
FIG. 4 is a circuit diagram showing an embodiment of a current sensor applicable to the present embodiment.

In FIG. 4, the current sensor 3 comprises a transformer 22 made up of three windings, namely first to third windings N1~N3 wound around a saturable magnetic body core 21, a high frequency signal generating circuit 23 for supplying a high frequency signal to the first winding N1 of the transformer 22, an AC amplifier 24 connected to the second winding N2 for amplifying a signal therefrom, a rectifying circuit 25 for rectifying an output from the AC amplifier 24, and a fail-safe on-delay circuit 26 for delaying an output of logic value "1" from the rectifying circuit 25 by a predetermined delay time "τ". The third winding N3 of the transformer 22 is disposed in series in the power line through which the motor current I flows to the motor 2. Here the AC amplifier 24 includes for example a level detection circuit such as a Schmitt circuit, so that the amplified output signal is level detected by the level detection circuit.

With the current sensor 3, when the motor current I does not flow in the third winding N3, the high frequency signal supplied to the first winding N1 from the high frequency signal generating circuit 23 is transmitted to the second winding N2 by way of the core 21. The received signal output is then amplified by the AC amplifier 24 and the amplified output "e" rectified by the rectifying circuit 25 and input to the on-delay circuit 26 as a rectified output signal "ed" where it is delayed, and the delayed output Z then input to the first off-delay circuit 5 shown in FIG. 1 as a logic value "1". When a current I is supplied to the motor 2 so that the current I flows in the third winding N3, the saturable magnetic body core 21 becomes saturated so that the function of the transformer 22 is lost. Therefore the high frequency signal supplied to the first winding N1 from the high frequency signal generating circuit 23 is not transmitted to the second winding N2, so that the output Z of the on-delay circuit 26 becomes a logic value "0". That is to say, the sensor is one which shows when a current does not flow to the motor 2 as a logic value "1" (safe condition), and shows when the motor current flows as a logic value "0" (danger condition).

Incidentally, if the motor current I is an alternating current, then as shown in FIG. 5, when the motor current I is flowing, there is periodically a zero point, so that a received signal output is intermittently generated in the second winding N2. This intermittently produced output of logic value "1" is therefore delayed by the predetermined delay time "τ" by the on-delay circuit 26, to sample/hold the intermittently produced rectified output signal "ed" of logic value 1, so that when the motor current I is present, the output of logic value "0" is continuously produced. Furthermore, the current sensor 3 has a fail-safe construction such that in the event of a disconnection or short circuit fault in the first or second windings N1, N2, the rectified output signal "ed" is not produced. Similarly, the rectified output signal "ed" is not produced if the saturable magnetic body core 21 becomes damaged.

As a method of construction of the current sensor, a method can be considered wherein, the flow of motor current is detected using the current transformer, and the detected output is negated in a NOT circuit to be made the sensor output. In this case, when the motor current flows, the input of the NOT circuit becomes a logic value "1" and as a result of the negation a sensor output of logic value "0" (indicating danger) is produced, while when the motor current does not flow, the input of the NOT circuit becomes a logic value "0" and due to the negation a sensor output of logic value "1" (indicating safety) is produced. However, with this method of construction, if a disconnection fault occurs in the input lead to the NOT circuit, the input to the NOT circuit becomes a logic value "0" in spite of the flow of motor current, so that the sensor output from the NOT circuit becomes a logic value "1" indicating safety. Moreover, if the power supply lead to the NOT circuit becomes disconnected, the sensor output from the NOT circuit becomes a logic value "0". There is thus the possibility of erroneous generation of either a logic value "1" or a logic value "0" due to a fault. Consequently, with a sensor construction using a NOT circuit which generates an output of logic value "1" when there is no motor current, a fail-safe construction which always errs towards a logic value "0" at the time of a fault is not possible. Therefore, for the current sensor used in the drive control apparatus of the present embodiment, it is necessary to have a construction as shown in FIG. 4 for the present embodiment, wherein a situation of no motor current flow is directly output as a logic value "1".

The specific circuit structure of the rotation sensor 4 shown in FIG. 6 will now be described.

In FIG. 6, the rotation sensor 4 comprises an alternating current signal generator 31 for generating an alternating current signal, a bridge circuit 32 made up of three resistors R1~R3, and an electromagnetic coil 4a and capacitor C with an approximately resonant condition with the high frequency signal frequency of the alternating current signal generator 31, an amplifier 33 for amplifying the unbalanced output of the bridge circuit 32, a rectifying circuit 34 for rectifying an output from the amplifier 33, and a known fail-safe window comparator 35 (for example as disclosed in U.S. Pat. No. 4,661,880 or U.S. Pat. No. 5,027,114), for level judging the output of the rectifying circuit 34. Here both the amplifier 33 and the rectifying circuit 34 have a fail-safe construction wherein the output becomes zero (logic value "0") at the time of a fault (see for example PCT/JP93/00411).

With the rotation sensor 4, when a recess portion of the gear 1 approaches the electromagnetic coil 4a with rotation of the gear 1, the output of the rectifying circuit 34 which is based on the unbalanced output of the bridge circuit 32 comes within the threshold value range of the window comparator 35 so that an alternating current oscillating output (logic value "1") is produced from the window comparator 35. On the other hand, when a protruding portion of the gear 1 approaches the electromagnetic coil 4a, the impedance of the electromagnetic coil 4a is reduced. The unbalanced output of the bridge circuit 32 thus increases so that the output of the rectifying circuit 34 exceeds the upper limit threshold value of the window comparator 35 and the output of the window comparator 35 becomes zero (logic value "0"). Consequently, the pulse signal as shown in FIG. 3 is generated from the rotation sensor 4 as a result of the protruding/recess portions approaching and separating from the electromagnetic coil 4a with rotation of the gear 1. In general, the oscillating output signal of the window comparator is rectified by a rectifying circuit and then output.

With the rotation sensor 4, if a fault occurs in the alternating current signal generator 31, the amplifier 33, or the rectifying circuit 34, then the sensor output which is based on the unbalanced output of the bridge circuit 32 becomes lower than the lower limit threshold value of the window comparator 35, so that the output of the window comparator becomes zero (logic value "0"). Moreover, if a short circuit or disconnection fault occurs in one side of the bridge circuit 32, the sensor output becomes higher than the upper limit threshold value of the window comparator 35, so that again the output of the window comparator 35 becomes zero (logic value "0"). A sensor which detects a change in impedance in such a fail-safe manner, is illustrated in U.S. Pat. No. 5,027,114.

The rotation sensor 4 is thus fail-safe, giving an output of logic value "0" at the time of a fault.

Moreover, an optical sensor type as shown in FIG. 7 may be used as the rotation sensor.

In FIG. 7, a light emitting element 41 and light receiving element 42 are arranged so as to face each other on opposite sides of an outer peripheral recess/protrusion portion of the gear 1. A high frequency signal from an alternating current signal generator 43 is sent to the light emitting element 41. The construction is such that a received signal output from the light receiving element 42 is amplified and rectified by an amplifier 44 and a rectifying circuit 45 similar to those of FIG. 6, to generate a binary sensor output.

With such a construction, an alternating current light beam due to the high frequency signal of the alternating current signal generator 43, is emitted from the light emitting element 41 towards the light receiving element 42. The light beam from the light emitting element 41 is received by the light receiving element 42 when the recess portion passes with rotation of the gear 1, and the received signal is amplified by the amplifier 44 and rectified by the rectifying circuit 45 to generate an output of logic value "1". When the protruding portion passes, the light beam is obstructed so that the output from the rectifying circuit 45 becomes a logic value "0".

Figure 8:
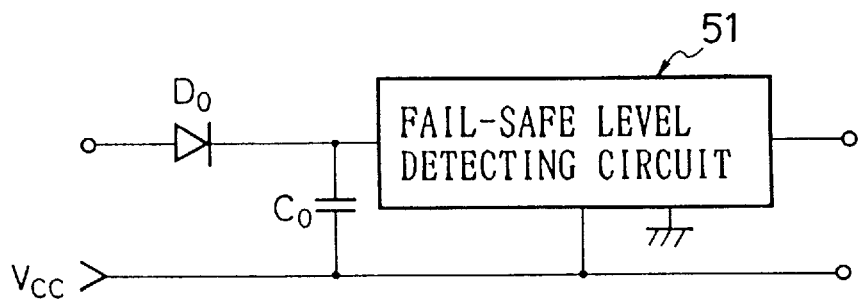
FIG. 8 is a circuit diagram showing an embodiment of a fail-safe off-delay circuit applicable to the present embodiment.

The specific circuit structure of a fail-safe off-delay circuit as shown in FIG. 8 which is used as the first and second off-delay circuits, will now be described.

The fail-safe off-delay circuit shown in FIG. 8 comprises a diode Do, a capacitor Co, and a fail-safe level detecting circuit 51 comprising the before mentioned fail-safe window comparator.

With the off-delay circuit, an alternating current sensor output signal on which is superimposed the power source voltage Vcc, is input, and the output of the integrating circuit comprising the diode Do and the capacitor Co is level detected by the level detecting circuit 51. An output is generated from the level detecting circuit 51 (logic value "1") from after input of the sensor output on which is superimposed the power source voltage Vcc, until the output voltage of the capacitor Co falls below the lower limit threshold value of the level detecting circuit 51, so that the drop in sensor output is delayed. The setting of the delay time can be freely set by changing the capacity of the capacitor Co. Furthermore, this can also be set by changing the set level of the lower limit threshold value.

The delay time is shortened, or an output signal is not generated from the level detecting circuit 51 if a disconnection or short circuit fault occurs in either one of the capacitor Co or the diode Do, resulting in a fail-safe construction wherein the delay time is not lengthened at the time of a fault.

The specific circuit structure of the OR circuit 8 shown in FIG. 9 will now be described.

Figure 9:
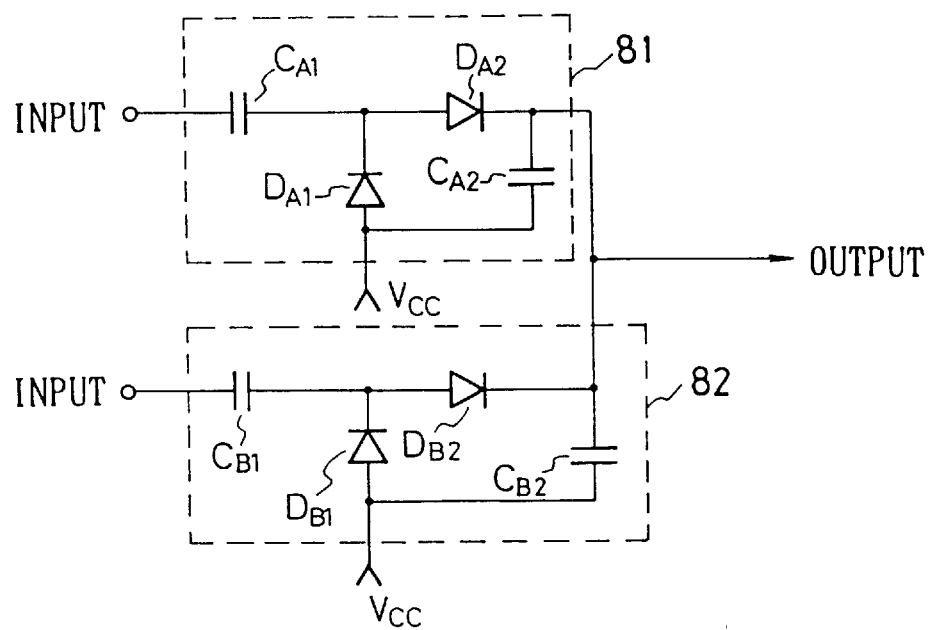
FIG. 9 is a circuit diagram showing an embodiment of an OR circuit applicable to the present embodiment.

In FIG. 9 the fail-safe OR circuit 8 is provided with first and second voltage doubler rectifying circuits 81, 82 for clamping the input signal at the power source voltage Vcc. The rectified output terminals of both the voltage doubler rectifying circuits 81, 82, are wired OR connected for the output of the OR circuit.

The first and second voltage doubler rectifying circuits 81, 82 comprise respective coupling capacitors $C_{A1}$, $C_{B1}$, respective diodes $D_{A1}$, $D_{B1}$ for clamping the outputs of the coupling capacitors $C_{A1}$, $C_{B1}$ at the power source voltage Vcc, diodes $D_{A2}$, $D_{B2}$ for preventing reverse current flow, and smoothing capacitors $C_{A2}$, $C_{B2}$.

When an alternating current signal is input from either the current sensor 3 side or the rotation sensor 4 side (the alternating current output signal due to the oscillations is output as a logic value "1" from the first off-delay circuit 5, and the on-delay circuit 7), the input signal is superimposed with the power source voltage Vcc and then output. That is to say, when a signal from the sensor side is input, if the voltage level of the input signal is V, the output level becomes V + Vcc (logic value "1"), while when there is no input signal from either sensor side, the output level becomes Vcc (logic value "0"). If a fault occurs in the capacitor or diode of the rectifying circuit of FIG. 9, an output higher than the power source voltage Vcc is not generated on the output side, at least if there is no input signal, so that the circuit is fail-safe.

Here the warning apparatus 9 into which the output of the OR circuit 8 is input, as mentioned before and shown in FIG. 1 comprises a V-F converter 10, an amplifier 11 and a speaker 12. The V-F converter 10 is constructed so as to respectively generate an inaudible frequency signal or an audible frequency signal depending on a sum of the input signal and a bias voltage. Here the input signal has a voltage level V superimposed with the power source voltage Vcc and the bias voltage is Vcc.

Accordingly, when an output of V+Vcc (logic value "1") is generated from the OR circuit 8, the input level of the V-F converter 10 of the warning apparatus 9 becomes a high level of the sum of the input signal and the bias voltage, so that a signal of an inaudible frequency (equal to or above 18 KHz) is generated, while when an output of Vcc (logic value "0") is generated from the OR circuit 8, then only the bias voltage Vcc results, and the input level of the V-F converter 10 becomes a low level, so that a signal of an audible frequency (several KHz) is generated.

Figure 10:
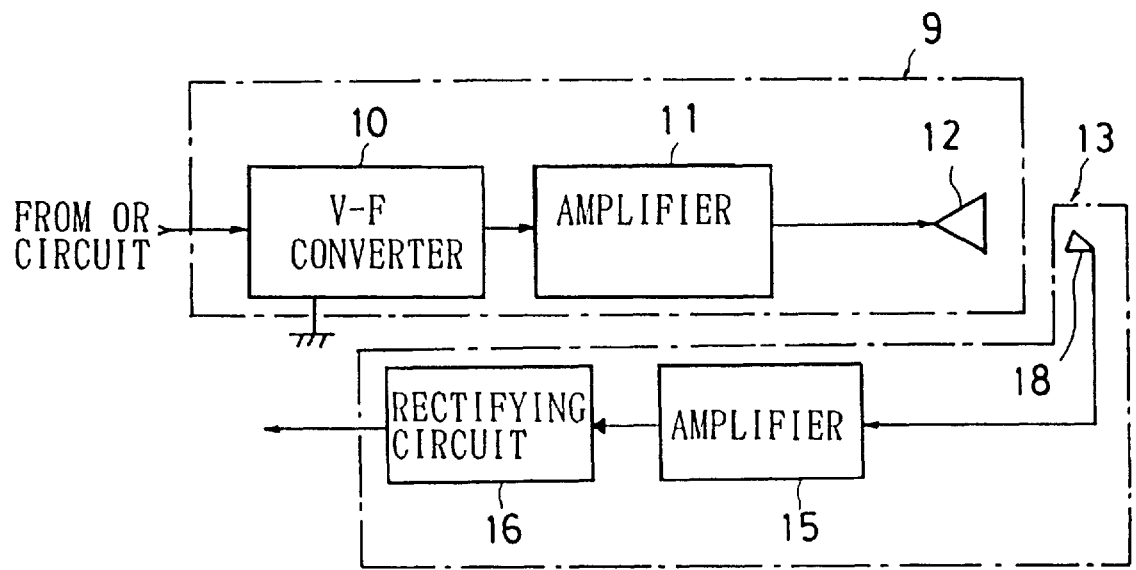
FIG. 10 is a circuit diagram showing another embodiment of a monitoring sensor.
Figure 11:
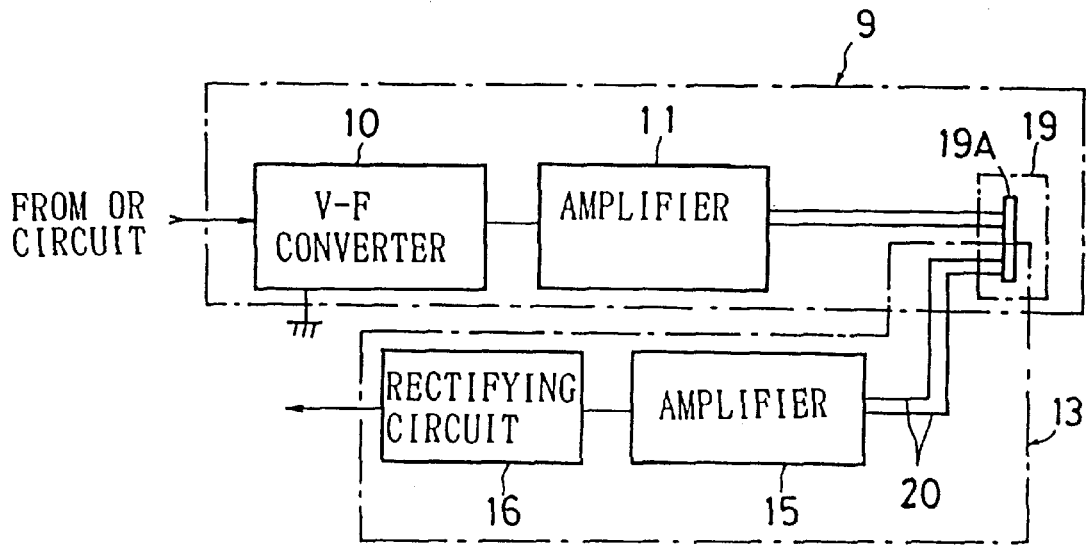
FIG. 11 is a circuit diagram showing another embodiment of a monitoring sensor for when a ceramic buzzer is used in a warning device.

The monitoring sensor for monitoring whether or not the warning apparatus 9 is normal, may be constructed as shown in FIG. 10, with a microphone 18 instead of the current transformer 14, located in the vicinity of the speaker 12 of the warning apparatus 9, so that a warning sound of an inaudible frequency and an audible frequency generated from the speaker 12 is received by the microphone 18 and converted to an electric signal, and then sent to the amplifier 15. Moreover, for the warning sound generator of the warning device, a ceramic buzzer type voltage driven device may be used instead of a speaker. In this case, since the drive current input to the buzzer is small and is thus difficult to be detected with the current transformer, a monitoring sensor using a microphone as shown in FIG. 10 is more suitable. Furthermore, with a warning apparatus using a ceramic buzzer, the construction may be such as shown in FIG. 11 wherein a lead wire 20 is connected to an oscillating body 19A of a ceramic buzzer 19 which is oscillated by an output signal from the amplifier 11, and the oscillation of the oscillating body 19A is taken out as an electric signal by the lead wire 20, and input to the amplifier 15.

Figure 12:
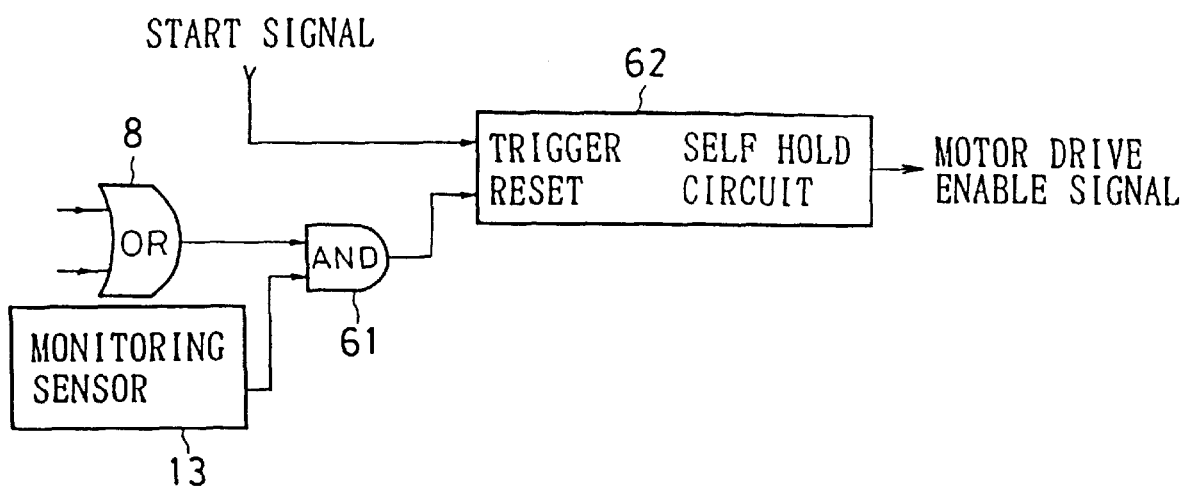
FIG. 12 is a circuit diagram illustrating the main parts of another embodiment of a drive control apparatus for a rotating machine according to the invention.

FIG. 12 shows the main parts of another embodiment of a drive control apparatus for a rotating machine according to the present invention.

With the drive control apparatus of the construction of FIG. 1, in the case wherein the motor current I is flowing and the output signal of the OR circuit 8 has a logic value "0" because the gear 1 is not rotating, the output signal of the AND circuit 17 also becomes a logic value "0" so that the motor start enable signal is cancelled and supply of motor current I is stopped. However, if the supply of motor current I is stopped, the output signal of the current sensor 3 becomes a logic value "1" so that through the medium of the off-delay circuit 5, an output signal of logic value "1" is generated by the OR circuit 8. As a result, a motor start enable signal of logic value "1" is generated by the AND circuit 17 so that the motor current I is again supplied.

The arrangement of FIG. 12 is for eliminating this undesirable situation.

In FIG. 12, the part corresponding to the second logic processing section in the circuit of FIG. 1 is constituted by an AND circuit 61 which acts as a logical product operating circuit for carrying out a logical product operation on the outputs of the OR circuit 8 and the monitoring sensor 13, and a self-hold circuit 62 wherein the logical output of the AND circuit 61 is made a reset input signal, and the start signal from the start switch is made a trigger input signal, which self-holds the trigger input signal and generates a motor start enable signal of logic value "1". The self-hold circuit 62 has a fail-safe construction in that it gives an output of a logic value "0" at the time of a fault.

In the case of the second logic processing section, when a logic value "0" is produced in the output signal of the OR circuit 8 or in the output signal of the monitoring sensor 13, the self-hold circuit 62 is reset so that the output becomes a logic value "0" and the motor start enable signal is cancelled. When the output signal of the self-hold circuit 62 has once becomes a logic value "0", it will not become a logic value "1" unless the start signal is again input and the rising signal is input to the self-hold circuit 62 as a trigger input signal. Consequently, the before mentioned undesirable situation due to the circuit of FIG. 1 can be eliminated.

The fail-safe self-hold circuit 62 wherein the output signal becomes a logic value "0" with a fault, can be constructed from a fail-safe AND gate applicable to the AND circuit 17, with the output signal of the AND gate fed back to the input terminal for the trigger signal input side (see for example U.S. Pat. No. 5,027,114).

Moreover, in the case wherein there is no monitoring sensor for monitoring the warning apparatus, the AND circuit 61 may be omitted, and the output signal of the OR circuit 8 input directly as a reset signal for the self-hold circuit.

With the present invention as described above, since the supply of motor current is carried out while verifying rotation of the movable part, it is possible to positively avoid the dangerous condition wherein the rotation of the movable part stops for a long time even though there is a flow of motor current. Drive control of the rotating machine can thus be safely accomplished. Also at the time of motor start-up the movable part can be reliably rotated. Moreover, in the case wherein a warning of danger is given by a sound generator such as a buzzer, a warning sound is not produced under normal conditions, but only at the time of danger so that there is no annoying sound. Also since at the time of a fault, this can be advised, the fail-safe characteristics are ensured.

Industrial Applicability

The present invention can prevent the occurrence of a dangerous accident due for example to stirring being stopped during operation of a stirring tower or the like for mixing and reacting materials. Operator safety can thus be improved, so that industrial applicability is considerable.

We claim:

1. A drive control apparatus for a rotating machine incorporating a movable part rotatingly driven by a motor, said apparatus comprising:

a fail-safe current sensor generating an output of logic value "1" when motor current is not flowing to said motor, said fail-safe current sensor generating an output of logic value "0" when the motor current is flowing and producing an output of logic value "0" at a time a fault occurs;

a fail-safe rotation sensor generating an output of logic value "1" when said movable part is rotating, said fail-safe rotation sensor generating an output of logic value "0" when said movable part is stopped and producing an output of logic value "0" at the time a fault occurs;

a fail-safe first logic processing section which senses a danger condition and generates on output valve of "0" when the motor current is flowing and the movable part is stopped, based on a logic operation on the outputs from said current sensor and said rotation sensor, and generates an output of logic value "0" at the time a fault occurs, said fail-safe first logic processing section generating an output of logic value "1" when not sensing a danger condition; and a fail-safe second logic processing section which generates a motor drive enable output of logic value "1" to allow motor current supply to said motor when an output of logic value "1" of said first logic processing section is generated, and which generates a start command output of logic value "1", by switching on a start switch of the rotating machine, both said motor drive enable output and said start command output being inputted together to said fail-safe second logic processing section, and which gives an output of logic value "0" at the time a fault occurs.

2. A drive control apparatus for a rotating machine according to claim 1, wherein said current sensor comprises: a saturable magnetic body core wound with three windings namely first, second and third windings, which becomes saturated when a motor current flows in said third winding; a high frequency signal generating circuit for supplying a high frequency excitation signal to said first winding; an AC amplifier connected to said second winding for amplifying a received signal received by said second winding; a rectifying circuit for rectifying an output from said AC amplifier; and a fail-safe on-delay circuit which delays the output from said rectifying circuit by a predetermined time delay and then generates an output, and wherein the delay time is not shortened at the time of a fault.

3. A drive control apparatus for a rotating machine according to claim 1, wherein said rotation sensor comprises: an electromagnetic coil provided in the vicinity of an outer peripheral portion of a gear which rotates as one with the movable part; a bridge circuit with said electromagnetic coil disposed on one side thereof and resistors disposed on other three sides thereof, an alternating current signal generator for supplying an alternating current signal to said bridge circuit; an AC amplifier for amplifying an unbalanced output of said bridge circuit; a rectifying circuit for rectifying an output of said AC amplifier; and a fail-safe window comparator for generating an output of logic value "1" when an output of said rectifying circuit is within a predetermined level range higher than a power source voltage, and which gives an output of logic value "0" at the time of a fault.

4. A drive control apparatus for a rotating machine according to claim 1, wherein said rotation sensor comprises: a light emitting element and a light receiving element arranged so as to face each other on opposite sides of an outer peripheral recess/protrusion portion of a gear which rotates as one with said movable part; an alternating current signal generator for supplying an alternating current signal to the light emitting element; an AC amplifier for amplifying a received signal output of the light receiving element generated when a light beam from the light emitting element is received; and a rectifying circuit for rectifying an output of said AC amplifier.

5. A drive control apparatus for a rotating machine according to claim 1, wherein said first logic processing section comprises: a fail-safe first off-delay circuit which delays for a predetermined time delay a falling output of said current sensor from a logic value "1" to a logic value "0", and wherein said delay time is not lengthened at the time of a fault; a fail-safe second off-delay circuit which delays for a predetermined time delay a falling output of said rotation sensor from a logic value "1" to a logic value "0", and wherein said delay time is not lengthened at the time of a fault; a fail-safe on-delay circuit which delays for a predetermined time delay a rising output of said second off-delay circuit from a logic value "0" to a logic value "1", and wherein said delay time is not shortened at the time of a fault; and a logical sum operating circuit which computes a logical sum of the outputs of said first off-delay circuit and said on-delay circuit.

6. A drive control apparatus for a rotating machine according to claim 5, wherein said logical sum operating circuit comprises: a first voltage doubler rectifying circuit for clamping an output of said first off-delay circuit at a power source voltage, and voltage doubler rectifying; and a second voltage doubler rectifying circuit for clamping an output of said on-delay circuit in a similar manner at the power source voltage, and voltage doubler rectifying, with a wired OR output of the rectified outputs of the first and second voltage doubler rectifying circuits made a logical sum output.

7. A drive control apparatus for a rotating machine according to claim 1, wherein there is provided a warning device which generates a warning when an output of said first logic processing section is at logic value "0" but not when at logic value "1", and a fail-safe monitoring sensor for monitoring whether or not said warning device is in a normal condition wherein warning is possible, and generating an output of logic value "1" when normal, and generating an output of logic value "0" when abnormal, and which gives an output of logic value "0" at the time of a fault, with a motor drive enable output of logic value "1" to allow power supply to said motor being generated when an output of logic value "1" from said monitoring sensor is input to said second logic processing section.

8. A drive control apparatus for a rotating machine according to claim 7, wherein said warning device comprises: a signal generating device for outputting an inaudible frequency signal when an output of said first logic processing section is at logic value "1" and outputting an audible frequency signal when the output is at logic value "0"; and a warning sound generator which is driven by an output signal from said signal generating device, and said monitoring sensor monitors the presence or absence of a signal from said signal generating device, and when there is a signal, judges said warning device as normal and generates an output of logic value "1", while when there is no signal, judges said warning device as abnormal and generates an output of logic value "0".

9. A drive control apparatus for a rotating machine according to claim 8, wherein said signal generating device is a voltage-frequency converter for generating a frequency signal corresponding to an output voltage of the first logic processing section.

10. A drive control apparatus for a rotating machine according to claim 1, wherein said second logic processing section is a fail-safe logical product operation circuit which carries out a logical product operation on an output from said first logic processing section and an output from said start switch, and which gives an output of logic value "0" at the time of a fault.

11. A drive control apparatus for a rotating machine according to claim 7, wherein said second logic processing section is a fail-safe logical product operation circuit which carries out a logical product operation on an output from said first logic processing section, an output from said start switch, and an output from said monitoring sensor, and which gives an output of logic value "0" at the time of a fault.

12. A drive control apparatus for a rotating machine according to claim 1, wherein said second logic processing section comprises, a fail-safe self-hold circuit with the output from the first logic processing section as a reset input and the output from said start switch as a trigger input, which self-holds the trigger input, and which gives an output of logic value "0" at the time of a fault.

13. A drive control apparatus for a rotating machine according to claim 7, wherein said second logic processing section comprises: a logical product operation circuit which carries out a logical product operation on an output from said first logic processing section and an output from said monitoring sensor; and a fail-safe self-hold circuit with the output from said logical product operation circuit as a reset input and the output from said start switch as a trigger input, which self-holds the trigger input, and which gives an output of logic value "0" at the time of a fault.

* * * * *

UNITED STATES PATENT AND TRADEMARK OFFICE
CERTIFICATE OF CORRECTION

PATENT NO.    : 5,825,144
DATED         : October 20, 1998
INVENTOR(S)   : Masatoshi SUZUKI et al.

It is certified that error appears in the above-identified patent and that said Letters Patent is hereby corrected as shown below:

In Claim 1, column 14, line 47, "on output valve" should read --an output value--.

Signed and Sealed this

Fourth Day of January, 2000

Attest:

*Attesting Officer*              *Acting Commissioner of Patents and Trademarks*